United States Patent
Wettach et al.

(10) Patent No.: US 11,124,594 B2
(45) Date of Patent: Sep. 21, 2021

(54) POLYURETHANE BASED ON RENEWABLE RAW MATERIALS

(71) Applicant: BASF SE, Ludwigshafen (DE)

(72) Inventors: Henning Wettach, Osnabrueck (DE); Kathrin Isenbügel, Mannheim (DE)

(73) Assignee: BASF SE, Ludwigshafen (DE)

( * ) Notice: Subject to any disclaimer, the term of this patent is extended or adjusted under 35 U.S.C. 154(b) by 1076 days.

(21) Appl. No.: 14/901,833

(22) PCT Filed: Jun. 20, 2014

(86) PCT No.: PCT/EP2014/063032
§ 371 (c)(1),
(2) Date: Dec. 29, 2015

(87) PCT Pub. No.: WO2015/000722
PCT Pub. Date: Jan. 8, 2015

(65) Prior Publication Data
US 2016/0152761 A1    Jun. 2, 2016

(30) Foreign Application Priority Data
Jul. 2, 2013   (EP) .................................. 13174649

(51) Int. Cl.
*C08G 18/42* (2006.01)
*C08G 18/10* (2006.01)
*C08G 18/66* (2006.01)

(52) U.S. Cl.
CPC ......... *C08G 18/4238* (2013.01); *C08G 18/10* (2013.01); *C08G 18/664* (2013.01)

(58) Field of Classification Search
CPC .......................... C08G 18/4238; C08G 18/664
See application file for complete search history.

(56) References Cited

U.S. PATENT DOCUMENTS

| | | | |
|---|---|---|---|
| 5,695,884 A | 12/1997 | Ishimaru et al. | |
| 6,395,833 B1 | 5/2002 | Tasaka et al. | |
| 2006/0121812 A1 | 6/2006 | Suzuki et al. | |
| 2006/0141883 A1 | 6/2006 | Nishiguchi et al. | |
| 2007/0161731 A1 | 7/2007 | Carvalho et al. | |
| 2012/0258269 A1* | 11/2012 | Gehringer et al. | 528/59 |
| 2013/0035448 A1 | 2/2013 | Ohara et al. | |
| 2014/0107311 A1* | 4/2014 | Farkas | C08G 18/10 528/65 |
| 2015/0299373 A1* | 10/2015 | Nefzger | C08G 18/42 521/119 |

FOREIGN PATENT DOCUMENTS

| | | | | |
|---|---|---|---|---|
| CN | 102532460 A | | 7/2012 | |
| CN | 102532460 B | * | 7/2013 | |
| DE | 196 07 870 A1 | | 9/1997 | |
| DE | 196 49 290 A1 | | 6/1998 | |
| DE | 197 06 452 A1 | | 8/1998 | |
| DE | 10 2006 009 096 A1 | | 9/2007 | |
| EP | 0 308 693 A1 | | 3/1989 | |
| EP | 0 670 339 A1 | | 9/1995 | |
| EP | 1 826 225 A2 | | 8/2007 | |
| JP | 5-163431 A | | 6/1993 | |
| JP | 07316254 | * | 12/1995 | ........... C08G 18/664 |
| JP | 2010280883 A | * | 1/2010 | ............. C08G 18/72 |
| JP | 2010280883 A | * | 12/2010 | ............. C08G 18/72 |
| JP | 2012180467 A | * | 9/2012 | |
| WO | WO 00/51660 A1 | | 9/2000 | |
| WO | WO 2008/104541 A1 | | 9/2008 | |
| WO | WO-2008104541 A1 | * | 9/2008 | ......... C08G 18/4238 |
| WO | WO 2010/031792 A1 | | 3/2010 | |
| WO | WO 2011/083000 A1 | | 7/2011 | |
| WO | WO 2011/095446 A1 | | 8/2011 | |
| WO | WO 2012/173911 A1 | | 12/2012 | |
| WO | WO 2013/045546 A1 | | 4/2013 | |
| WO | WO 2014/029975 A2 | | 2/2014 | |
| WO | WO-2014064130 A1 | * | 5/2014 | ............. C08G 18/42 |

OTHER PUBLICATIONS

CN-102532460_English Translation Jul. 2013.*
WO-2008104541_09-2008, English Translation.*
JP-2012180467-A. Sep. 2012. English Translation.*
JP-07316254_English Translation_12-1995.*
JP-2010280833_Nishiguchi et al. Jan. 2010_English Translation.*
JP-2010280883-A_12-2010_English Translation.*
International Search Report and Written Opinion dated Jul. 11, 2014 in PCT/EP2014/063032 (with partial English language translation).
International Preliminary Report on Patentability dated Jun. 16, 2015 in PCT/EP2014/063032 (with partial English language translation).
Dr. Hans Zweifel, "Plastics Additives Handbook, 5th edition" Hanser Publishers, 2001, pp. 98-136.
Dr. Hans Zweifel, "Plastics Additives Handbook, 5th edition" Hanser Publishers, 2001, pp. 442-466.

* cited by examiner

Primary Examiner — Michael L Leonard
(74) Attorney, Agent, or Firm — Grüneberg and Myers PLLC

(57) ABSTRACT

The present invention relates to polyurethanes based on at least one polyisocyanate and at least one polyester polyol, wherein the polyester polyol is based on at least one polyhydric alcohol and a mixture of two or more dicarboxylic acids, wherein at least one of the two or more dicarboxylic acids is at least partly obtained from renewable raw materials, to processes for producing such polyurethanes and also to moldings comprising such polyurethanes. The polyurethanes of the present invention have minimal tendency to bloom.

18 Claims, No Drawings

POLYURETHANE BASED ON RENEWABLE RAW MATERIALS

The present invention relates to polyurethanes based on at least one polyisocyanate and at least one polyester polyol, wherein the polyester polyol is based on at least one polyhydric alcohol and a mixture of two or more dicarboxylic acids, wherein at least one of the two or more dicarboxylic acids is at least partly obtained from renewable raw materials, to processes for producing such polyurethanes and also to moldings comprising such polyurethanes. The polyurethanes of the present invention have minimal tendency to bloom.

Polymeric hydroxy compounds such as polyester polyols react with isocyanates to form polyurethanes which have various possible uses, depending on their specific mechanical properties. Polyester polyols in particular have favorable properties and so are used for high-grade polyurethane products.

Polyurethanes at least partly obtained by use of renewable raw materials are known, for example from WO 2011/083000 A1, WO 2012/173911 A1 or WO 2010/031792 A1.

The use of natural raw materials in the polymer industry is becoming more and more significant because the starting materials are occasionally less costly. There is also increasing market demand for polyurethane products based on renewable raw materials and hence at least partial replacement of petrochemical raw materials.

Natural raw materials are more particularly substances obtained by processing plants or parts of plants (or else animals). Raw materials from renewable sources are characterized by a significant proportion of the carbon isotope $^{14}C$. Its determination allows experimental determination of the proportion of renewable raw materials. Renewable raw materials differ from materials obtained by chemical synthesis and/or by petroleum processing in that they are less homogeneous—their composition can vary to a distinctly greater extent.

Fluctuations in the composition of natural raw materials are for example dependent on factors such as the climate and region in which the plant grows, the time of year at which it is harvested, variations between biological species and subspecies and the type of extraction method used to recover the natural raw material (extrusion, centrifugation, filtering, distillation, cutting, pressing, etc.). These fluctuations in the composition of natural raw materials and the presence of further, difficult-to-remove concomitants, such as degradation products or impurities, frequently lead to problems in further processing and therefore limit the industrial use of these materials.

Preparing polyester polyols by reaction of starting materials obtained from natural raw materials is of enormous interest specifically for the production of (thermoplastic) polyurethanes for the shoe industry for example.

U.S. Pat. No. 5,695,884 discloses the use of polyester polyols based on sebacic acid for thermoplastic polyurethanes of high crystallinity. U.S. 2006/0141883 A1 and U.S. 2006/0121812 also describe the use of polyester polyols based on sebacic acid for polyurethanes for fibers having a high melting point. WO 00/51660 A1 describes polyurethanes for heart catheters which can utilize polyester polyols based on sebacic acid; again, sufficient hardness is required.

U.S. 2007/0161731 A1 and U.S. Pat. No. 6,395,833 B1 further disclose using sebacic acid to produce polyester polyols for use in polyurethane chemistry.

However, there is a problem with using polyester polyols based on sebacic acid in the manufacture of polyurethanes in that it is increasingly found that very pronounced efflorescence occurs in that the processed polyurethane develops a white bloom, so there are many potential applications for which its appearance is no longer acceptable.

It is an object of the present invention to provide polyurethanes, in particular thermoplastic polyurethanes, that have good mechanical properties, are obtainable when using renewable raw materials and also have a reduced proclivity to bloom.

We have found that this object is achieved according to the present invention by a polyurethane based on at least one polyisocyanate and at least one polyester polyol, wherein the polyester polyol is based on at least one polyhydric alcohol and a mixture of two or more dicarboxylic acids, wherein at least one of the two or more dicarboxylic acids is at least partly obtained from renewable raw materials.

In the present invention, the polyurethane is based on at least one polyisocyanate and at least one polyester polyol, wherein the polyester polyol is based on at least one polyhydric alcohol and a mixture of two or more dicarboxylic acids, wherein at least one of the two or more dicarboxylic acids is at least partly obtained from renewable raw materials. To prove that a feedstock was obtained from renewable raw materials, the $^{14}C$ method of ASTMD6866 can be used for example.

The polyurethane may include further components, for example at least one chain extender or else hydrolysis control agents, antioxidants, UV stabilizers, plasticizers, organic or inorganic fillers, demolding assistants, and also further customary additives.

In one further embodiment, therefore, the present invention also provides a polyurethane as described above that comprises at least one chain extender.

In one further embodiment, the present invention also provides a polyurethane as described above that is a thermoplastic polyurethane.

It was found that, surprisingly, the polyurethanes of the present invention have a distinctly reduced tendency to bloom while retaining good mechanical properties, comparable to those of commercially available thermoplastic polyurethanes.

At the same time, the polyurethanes of the present invention are preferably transparent. The polyurethanes of the present invention further have but a low Yellowness Index, i.e., they scarcely discolor. Often, the use of biobased raw materials leads to discolorations in the end product, as reflected in a high Yellowness Index for the end products. (Thermoplastic) polyurethanes having a high Yellowness Index are likewise unwanted on the customer side, and further limit the potential applications for such products.

The polyurethanes of the present invention are obtained by using at least one polyester polyol, wherein the polyester polyol is based on at least one polyhydric alcohol and a mixture of two or more dicarboxylic acids, wherein at least one of the two or more dicarboxylic acids is at least partly obtained from renewable raw materials.

In principle, any suitable polyesterol known to a person skilled in the art is useful for the purposes of the present invention. The polyester polyols employed for the purposes of the present invention preferably have an average functionality in the range from 1.8 to 2.3, more preferably in the range from 1.9 to 2.2 and especially equal to 2. The polyester polyol of the present invention is preferably a polyester diol. Accordingly, in a further embodiment, the present invention provides a polyurethane based on at least one polyisocyanate and at least one polyester diol, wherein the polyester diol is based on at least one polyhydric alcohol and a mixture of two or more dicarboxylic acids, wherein at least one of the two or more dicarboxylic acids is at least partly obtained from renewable raw materials.

Suitable molecular weight ranges for the polyester polyols employed for the purposes of the present invention are known per se to a person skilled in the art. In one preferred embodiment, the molecular weight of the polyester polyol is in the range from 500 to 4000 g/mol, more preferably in the range from 800 and 3000 g/mol and most preferably in the range from 1000 and 2500 g/mol.

Particularly suitable polyester polyols for the purposes of the present invention have an OH number in the range from 25 to 230 mg KOH/g, more preferably in the range from 35 to 140 mg KOH/g and most preferably in the range from 40 to 115 mg KOH/g.

In the present invention, the polyester polyol is based on a polyhydric alcohol. Suitable polyhydric alcohols include, for example, polyhydric aliphatic alcohols, for example aliphatic alcohols having 2, 3, 4 or more OH groups, for example 2 or 3 OH groups. Suitable aliphatic alcohols for the purposes of the present invention include, for example, C2 to C12 alcohols, preferably C2 to C8 alcohols and most preferably C2 to C6 alcohols. It is preferable for the purposes of the present invention for the polyhydric alcohol to be a diol, and suitable diols are known per se to a person skilled in the art.

Suitable aliphatic C2 to C6 diols include, for example, ethylene glycol, diethylene glycol, 3-oxapentane-1,5-diol, 1,3-propanediol, 1,2-propanediol, dipropylene glycol, 1,4-butanediol, 1,5-pentanediol, 1,6-hexanediol, 2-methyl-1,3-propanediol and 3-methyl-1,5-pentanediol. It is further preferable for the polyhydric alcohol to be selected from the group consisting of 1,3-propanediol and 1,4-butanediol.

In one further embodiment, the present invention also provides a polyurethane as described above wherein the at least one polyhydric alcohol is selected from the group consisting of aliphatic C2 to C6 diols.

In one further embodiment, the present invention also provides a polyurethane as described above wherein the at least one polyhydric alcohol is selected from the group consisting of 1,3-propanediol and 1,4-butanediol.

It is also possible for the purposes of the present invention to employ a polyhydric alcohol at least partly obtained from renewable raw materials. The polyhydric alcohol in question may be partly or wholly obtained from renewable raw materials. It is also possible to employ a mixture of two or more polyhydric alcohols in the present invention. Where a mixture of two or more polyhydric alcohols is employed, one or more of the polyhydric alcohols employed may be at least partly obtained from renewable raw materials.

1,3-Propanediol may accordingly comprise synthetically produced 1,3-propanediol, but in particular 1,3-propanediol from renewable raw materials ("biobased 1,3-propanediol"). Biobased 1,3-propanediol is obtainable from maize (corn) and/or sugar for example. A further possibility is the conversion of waste glycerol from biodiesel production. In one further preferred embodiment of the invention, the polyhydric alcohol is a 1,3-propanediol at least partly obtained from renewable raw materials.

In one further embodiment, the present invention also provides a polyurethane as described above wherein the at least one polyhydric alcohol is a 1,3-propanediol at least partly obtained from renewable raw materials.

Alcohols having three or more OH groups can also be used to enhance the functionality of the polyester polyols. Examples of alcohols having three or more OH groups are glycerol, trimethylolpropane and pentaerythritol. It is also possible to use oligomeric or polymeric products having two or more hydroxyl groups. Examples thereof are polytetrahydrofuran, polylactones, polyglycerol, polyetherols, polyesterol or $\alpha,\omega$-dihydroxypolybutadiene.

The polyester polyol in the present invention is based not only on at least one polyhydric alcohol but also on a mixture of two or more dicarboxylic acids, wherein at least one of the two or more dicarboxylic acids is at least partly obtained from renewable raw materials. Suitable dicarboxylic acids for preparing polyester polyols are known per se to a person skilled in the art.

The present invention utilizes a mixture of two or more dicarboxylic acids, for example a mixture of two, three or four dicarboxylic acids. A mixture of two or three different dicarboxylic acids selected from the group of C2 to C12 dicarboxylic acids may be concerned in the context of the present invention for example. By C2 to C12 dicarboxylic acids are meant dicarboxylic acids which are aliphatic or branched and have two to twelve carbon atoms. It is also possible for dicarboxylic acids employed in accordance with the present invention to be selected from C2 to C14 dicarboxylic acids, preferably C4 to C12 dicarboxylic acids and more preferably C6 to O10 dicarboxylic acids.

One or more of the dicarboxylic acids employed for the purposes of the present invention may also be in the form of a carboxylic diester or in the form of a carboxylic anhydride. Aliphatic and/or aromatic dicarboxylic acids may in principle be employed as dicarboxylic acid.

The present invention utilizes a mixture of two or more dicarboxylic acids, wherein at least one of the two or more dicarboxylic acids is at least partly obtained from renewable raw materials. The mixture employed in this connection in the context of the present invention may also comprise three or more dicarboxylic acids, in which case at least one of the dicarboxylic acids present was at least partly obtained from renewable raw materials. In one embodiment of the present invention, the mixture employed consists of two dicarboxylic acids subject to the proviso that at least one of the two dicarboxylic acids was at least partly obtained from renewable raw materials.

Suitable dicarboxylic acids are obtainable from natural raw materials by specific methods of processing. For instance, treating castor oil with sodium hydroxide or potassium hydroxide at high temperatures in the presence of comparatively long-chain alcohols (such as 1- or 2-octanol) will result in sebacic acid being obtainable in a purity of >99.5% among other products according to reaction conditions. Sebacic acid (1,8-octanedicarboxylic acid) is a member of the homologous series of aliphatic dicarboxylic acids. Succinic acid and/or 2-methylsuccinic acid are particularly suitable as well as sebacic acid. They are obtainable for example from natural raw materials such as sugar or corn (maize), by fermentation. Azelaic acid at least partly obtained from renewable raw materials is a further suitable dicarboxylic acid for the purposes of the present invention.

In one particularly preferred embodiment of the invention, the dicarboxylic acid at least partly obtained from natural raw materials is selected from the group consisting of sebacic acid, azelaic acid, dodecanedioic acid and succinic acid.

In a further preferred embodiment of the invention, the mixture employed comprises sebacic acid obtained from renewable raw materials.

In one further embodiment, the present invention also provides a polyurethane as described above wherein the mixture of two or more dicarboxylic acids comprises a sebacic acid at least partly obtained from renewable raw materials.

Dicarboxylic acids employed as further dicarboxylic acids alongside the at least one dicarboxylic acid at least partly obtained from renewable raw materials are preferably likewise selected from the group of C2 to C12 dicarboxylic acids. The aforementioned dicarboxylic acids plus particularly adipic acid are suitable.

In one further embodiment, the present invention also provides a polyurethane as described above wherein the mixture of two or more dicarboxylic acids comprises a sebacic acid at least partly obtained from renewable raw materials, and adipic acid.

It is also possible for the purposes of the present invention for the mixture to comprise, in addition to a sebacic acid at least partly obtained from renewable raw materials, at least one further dicarboxylic acid at least partly based on renewable raw materials. Accordingly, in a further embodiment of the present invention, the mixture comprises two dicarboxylic acids both at least partly obtained from renewable raw materials.

For example, the mixture of two or more dicarboxylic acids may comprise at least sebacic acid and adipic acid, in which case it is also possible for both the sebacic acid and the adipic acid to be at least partly obtained from renewable raw materials.

The extent to which the mixture of the two or more dicarboxylic acids consists of sebacic acid and adipic acid is preferably not less than 90 wt %, more preferably from 95 to 100 wt % and most preferably from 98 to 99.99 wt %.

The mixing ratio between the dicarboxylic acids employed in the mixture may vary between wide limits for the purposes of the present invention. Expressed in mol % for the two or more dicarboxylic acids, this mixing ratio may in a preferred embodiment be in the range from 90:10 to 10:90, more preferably from 80:20 to 20:80 and most preferably from 70:30 to 30:70.

In a further preferred embodiment, the mixing ratio in mol % between the dicarboxylic acids sebacic acid and adipic acid is in the range from 90:10 to 10:90, more preferably from 80:20 to 20:80 and most preferably from 70:30 to 30:70.

According to the present invention, at least one of the dicarboxylic acids employed and preferably also the polyhydric alcohol employed are preferably at least partly obtained from renewable raw materials. At least partly is to be understood as meaning in the context of the present invention that the corresponding dicarboxylic acid or the alcohol was obtained from renewable raw materials to an extent of not less than 25%, in particular that it was obtained from renewable raw materials to an extent in the range from 50 to 100%, more preferably in the range from 75 to 100%, yet more preferably in the range from 85 to 100%, and most preferably in the range from 95 to 100%.

In a further embodiment of the present invention, polyester polyols are prepared by employing dicarboxylic acids and polyhydric alcohols that were each at least partly obtained from renewable raw materials.

Processes for preparing polyester polyols by polycondensation of the corresponding hydroxy compounds with dicarboxylic acids preferably at elevated temperature and reduced pressure preferably in the presence of known catalysts are common knowledge and have been extensively described.

Processes for preparing polyurethanes are likewise common knowledge. For example, thermoplastic polyurethanes are obtainable by reaction of isocyanates with polyester polyol and optionally chain-extending agents having a molecular weight of 50 to 499 g/mol in the presence or absence of catalysts and/or customary assistants.

The ratio of the components employed may in principle vary between wide limits. This ratio of the components employed is typically described by the ratio of NCO groups to OH groups, the OH groups being the sum total of the OH groups for the employed polyester polyol, chain extender and any further additives.

The ratio of NCO to OH groups in the present invention is in the range from 0.9 to 1.1 for example and is preferably in the range from 0.95 to 1.05.

The preferably thermoplastic polyurethanes are prepared according to the present invention by reacting the isocyanate with the polyester polyol and optionally further isocyanate-reactive compounds and optionally chain-extending agents in the presence or absence of catalysts and/or customary assistants. Plasticizers may also be employed in the present invention for example. The plasticizers which are used, which is preferable according to the present invention, may have isocyanate-reactive groups. However, it is likewise possible for the plasticizers employed not to have any isocyanate-reactive groups. Suitable plasticizers are known per se, see for instance the Plastics Additive Handbook, 5th edition, H. Zweifel, ed, Hanser Publishers, Munich, 2001.

The polyurethane of the present invention is also obtainable via the intermediate stage of prepolymers. Only incomplete chains of the polymer are initially prepared in order that the end-user may have the benefit of simpler processing, particularly of the isocyanate component. The incompletely reacted starting materials thus provided are also referred to as the system, which are very important in the manufacture of shoe soles for example.

As organic isocyanates there may be used commonly known aromatic, aliphatic, cycloaliphatic and/or araliphatic isocyanates, preferably diisocyanates, for example 2,2'-, 2,4'- and/or 4,4'-diphenylmethane diisocyanate (MDI), 1,5-naphthylene diisocyanate (NDI), 2,4- and/or 2,6-tolylene diisocyanate (TDI), diphenylmethane diisocyanate, 3,3'-dimethyldiphenyl diisocyanate, 1,2-diphenylethane diisocyanate and/or phenylene diisocyanate, tri-, tetra-, penta-, hexa-, hepta- and/or octamethylene diisocyanate, 2-methylpentamethylene 1,5-diisocyanate, 2-ethylbutylene 1,4-diisocyanate, pentamethylene 1,5-diisocyanate, butylene 1,4-diisocyanate, 1-isocyanato-3,3,5-trimethyl-5-isocyanatomethylcyclohexane (isophorone diisocyanate, IPDI), 1-isocyanato-4-[(4-isocyanatocyclohexyl)methyl]cyclohexane (H12MDI), 2,6-diisocyanatohexanecarboxylic ester, 1,4- and/or 1,3-bis(isocyanatomethyl)cyclohexane (HXDI), 1,4-cyclohexane diisocyanate, 1-methyl-2,4- and/or -2,6-cyclohexane diisocyanate and/or 4,4'-, 2,4'- and 2,2'-dicyclohexylmethane diisocyanate, preferably 2,2'-, 2,4'- and/or 4,4'-diphenylmethane diisocyanate (MDI), 1,5-naphthylene diisocyanate (NDI), 2,4- and/or 2,6-tolylene diisocyanate (TDI), hexamethylene diisocyanate, 1-isocyanato-4-[(4-isocyanatocyclohexyl)methyl]cyclohexane, and/or IPDI, more particularly 4,4'-MDI and/or hexamethylene diisocyanate and/or H12MDI.

In one further embodiment, the present invention also provides a polyurethane as described above wherein the polyisocyanate employed for preparation is selected from the group consisting of 2,2'-, 2, 4'- and 4,4'-diphenylmethane diisocyanate (MDI), 2,4- and 2,6-tolylene diisocyanate (TDI), hexamethylene diisocyanate and 1-isocyanato-4-[(4-isocyanatocyclohexyl)methyl]cyclohexane (H12MDI).

Useful chain extenders include commonly known aliphatic, araliphatic, aromatic and/or cycloaliphatic compounds having a molecular weight of 50 to 499 g/mol, preferably 2-functional compounds, examples being alkanediols having 2 to 10 carbon atoms in the alkylene radical, preferably 1,4-butanediol, 1,6-hexanediol and/or di-, tri-, tetra-, penta-, hexa-, hepta-, octa-, nona- and/or decaalkylene glycols of 3 to 8 carbon atoms, preferably unbranched alkanediols, more particularly 1,3-propanediol and 1,4-butanediol.

For the purposes of the present invention it is preferable for the chain extender to be selected from the group consisting of aliphatic C2-C6 diols, more preferably from the group consisting of 1,3-propanediol, 1,4-butanediol and 1,6-hexanediol.

In one further embodiment, the present invention also provides a polyurethane as described above wherein the at least one chain extender is selected from the group consisting of C2 to C6 diols.

It is further preferable for the purposes of the present invention for the chain extender employed to be at least partly obtained from renewable raw materials. It is possible for the purposes of the present invention for the chain extender employed to be partly or wholly obtained from renewable raw materials.

In a further preferred embodiment, the chain extender is accordingly selected from the group consisting of 1,3-propanediol and 1,3-propanediol at least partly obtained from renewable raw materials.

In a further preferred embodiment, at least one of the two or more dicarboxylic acids and the polyhydric alcohol employed for preparing the polyester polyols and the chain extender employed have each been at least partially obtained from renewable raw materials.

Suitable catalysts for speeding in particular the reaction between the NCO groups of the polyisocyanates and the polyol component are the customary compounds which are known from the prior art and are derivable from the literature. Examples of suitable catalysts in the context of the present invention are tertiary amines, for example triethylamine, dimethylcyclohexylamine, N-methylmorpholine, N,N'-dimethylpiperazine, 2-(dimethylaminoethoxy)ethanol, diazabicyclo (2,2,2)octane and the like and also, more particularly, organic metal compounds such as titanic esters, iron compounds such as, for example, iron(VI) acetylacetonate, tin compounds, for example tin diacetate, tin dioctoate, tin dilaurate or the tin dialkyl salts of aliphatic carboxylic acids such as dibutyltin diacetate, dibutyltin dilaurate or the like. The catalysts are customarily used in amounts of 0.00001 to 0.1 part by weight per 100 parts by weight of polyhydroxy compound.

In addition to catalysts, the structural components, i.e., the polyols, isocyanates and chain extenders, may also have added to them customary auxiliaries. Examples are blowing agents, surface-active substances, flame retardants, nucleating agents, lubricating and demolding aids, dyes and pigments, stabilizers, for example against hydrolysis, light, heat or discoloration, inorganic and/or organic fillers, reinforcing agents, plasticizers and metal deactivators. Hydrolysis control agents used are preferably oligomeric and/or polymeric aliphatic or aromatic carbodiimides. To stabilize the polyurethane of the present invention against aging, the polyurethane preferably has stabilizers added to it. Stabilizers for the purposes of the present invention are additives which protect a plastic or a plastic mixture against harmful environmental effects. Examples are primary and secondary antioxidants, thiosynergists, organophosphorus compounds of trivalent phosphorus, hindered amine light stabilizers, UV absorbers, hydrolysis control agents, quenchers and flame retardants. Examples of commercial stabilizers are given in Plastics Additive Handbook, 5th Edition, H. Zweifel, ed., Hanser Publishers, Munich, 2001, p. 98-p. 136. When the polyurethane of the present invention is exposed to thermal oxidative damage, during use, antioxidants can be added. Preference is given to using phenolic antioxidants. Examples of phenolic antioxidants are given in Plastics Additive Handbook, 5th edition, H. Zweifel, ed, Hanser Publishers, Munich, 2001, pp. 98-107 and p. 116-p. 121. Preference is given to phenolic antioxidants having a molecular weight greater than 700 g/mol. One example of a phenolic antioxidant which is preferably used is pentaerythrityl tetrakis (3-(3,5-bis(1,1-dimethylethyl)-4-hydroxyphenyl)propionate) (Irganox® 1010) or other high molecular weight condensation products formed from corresponding antioxidants. The phenolic antioxidants are generally used in concentrations of between 0.1% and 5% by weight, preferably between 0.1% and 2% by weight and especially between 0.5% and 1.5% by weight, all based on the total weight of the polyurethane. Preference is further given to using antioxidants which are amorphous or liquid. Even though the polyurethanes of the present invention are by virtue of their preferable composition distinctly more stable to ultraviolet radiation than, for example, polyurethanes plasticized with phthalates or benzoates, stabilization with phenolic stabilizers only is often insufficient. For this reason, the polyurethanes of the present invention which are exposed to UV light are preferably additionally stabilized with a UV absorber. UV absorbers are molecules which absorb high energy UV light and dissipate the energy. UV absorbers widely used in industry belong for example to the group of the cinnamic esters, the diphenyl cyanoacrylates, the oxamides (oxanilides), more particularly 2-ethoxy-2'-ethyloxanilide, the formamidines, the benzylidenemalonates, the diarylbutadienes, triazines and also the benzotriazoles. Examples of commercial UV absorbers are given in Plastics Additive Handbook, 5th edition, H. Zweifel, ed, Hanser Publishers, Munich, 2001 pp. 116-122. In a preferred embodiment, the UV absorbers have a number average molecular weight greater than 300 g/mol and more particularly greater than 390 g/mol. Furthermore, the UV absorbers which are preferably used should have a molecular weight of not greater than 5000 g/mol and more preferably of not greater than 2000 g/mol. The group of the benzotriazoles is particularly useful as UV absorbers. Examples of particularly useful benzotriazoles are Tinuvin® 213, Tinuvin® 328, Tinuvin® 571, and also Tinuvin® 384 and Eversorb® 82. The UV absorbers are preferably added in amounts between 0.01% and 5% by weight, based on the total mass of polyurethane, more preferably between 0.1% and 2.0% by weight and especially between 0.2% and 0.5% by weight, all based on the total weight of the polyurethane. Often, an above-described UV stabilization based on an antioxidant and a UV absorber is still not sufficient to ensure good stability for the polyurethane of the present invention against the harmful influence of UV rays. In this case, a hindered amine light stabilizer (HALS) can preferably be added in addition to the antioxidant and the UV absorber. A particularly preferred UV stabilization comprises a mixture of a phenolic stabilizer, a benzotriazole and a HALS compound in the above-described preferred amounts. However, it is also possible to use compounds which combine the functional groups of the stabilizers, for example sterically hindered piperidylhydroxybenzyl condensation products such as for example di(1,2,2,6,6-pentamethyl-4-piperidyl) 2-butyl-2-(3,5-di-tert-butyl-4-hydroxybenzyl) malonate, Tinuvin® 144.

Particular suitability also extends to waxes which perform important functions not only in the industrial production of the polyurethanes but also in their processing. The wax serves as a friction-reducing internal and external lubricant and thus improves the flow properties of the polyurethane. In addition, it is said to act as a release agent preventing the adherence of polyurethane to the surrounding material (the mold for example), and as a dispersant for other added substances, for example pigments and antiblocking agents. Suitable are for example fatty acid esters, such as stearic esters and montan esters and their metal soaps, but also fatty acid amides, such as stearylamides and oleamides, or else polyethylene waxes. An overview of waxes used in thermoplastics is given in H. Zweifel (Ed.): Plastics Additives Handbook, 5th edition, Hanser Verlag, Munich 2001, pp. 443 ff., EP-A 308 683, EP-A 670 339 and JP-A 5 163 431.

It is further also possible to add ester and amide combinations as per DE-A 19 607 870 and wax mixtures of montan acid and fatty acid derivatives (DE-A 196 49 290), and also hydroxy-stearylamides as per DE 10 2006 009 096 A1.

A particularly preferred embodiment utilizes fatty acids as per DE-A-19706452 of 24 to 34 carbon atoms and/or esters and/or amides of these fatty acids in the case of polyurethanes with desired reduced tendency to take up and/or give off substances, for which the fatty acids and/or their derivatives are used in a weight fraction of 0.001 to 15 wt %, based on the total weight of the polyisocyanate polyaddition products. A further preferred embodiment utilizes a mixture as per EP-A-1826225 of the reaction products of alkylenediamines with a) one or more linear fatty acids and of alkylenediamines with b) 12-hydroxystearic acid and/or of the reaction products of alkylenediamines with c) 12-hydroxystearic acid and one or more linear fatty acids. This mixture thus comprises the reaction products of alkylenediamine with a) and b) and/or c).

Further details about the abovementioned auxiliaries and added substances are derivable from the technical literature, for example from Plastics Additive Handbook, 5th edition, H. Zweifel, ed, Hanser Publishers, Munich, 2001. All molecular weights mentioned in this reference have the unit [g/mol].

The present invention also provides a process for producing a thermoplastic polyurethane, which process at least comprises the step of reacting at least one polyisocyanate and at least one polyester polyol, wherein the polyester polyol is based on at least one polyhydric alcohol and a mixture of two or more dicarboxylic acids, wherein at least one of the two or more dicarboxylic acids was at least partly obtained from renewable raw materials.

The preparation of the polyurethanes can be carried out according to the known processes as a batch operation or as a continuous operation, for example using reactive extruders or the belt process by the one shot or the prepolymer process, preferably by the one shot process. In these processes, the reactant components can be mixed in succession or at the same time, and the reaction ensues immediately. In the extruder process, the structural components and also optionally chain extender, catalyst and/or added substances are introduced into the extruder individually or as a mixture, reacted at temperatures of 100 to 280° C. and preferably 140 to 250° C., for example, and the polyurethane obtained is extruded, cooled down and pelletized.

The processing of the polyurethanes of the present invention, which are typically in the form of pellets or powders, to form the desired self-supporting films/sheets, molded parts, rollers, fibers, linings in automobiles, hoses, cable plugs, bellows, drag cables, cable sheathing, gaskets, belts or shock-absorbing elements is effected according to customary processes, for example injection molding, calendering or extrusion.

The present invention also provides the method of using a polyurethane as described above or a polyurethane obtainable by a process as described above in the manufacture of moldings, hoses, self-supporting film/sheet or fiber and non-woven articles.

The present invention also provides a molding, self-supporting film/sheet, hose, non-woven article or fiber comprising a polyurethane as described above or a polyurethane obtainable by a process as described above.

Further embodiments of the present invention are derivable from the claims and the examples. It will be understood that the aforementioned and hereinbelow elucidated features of the article/process/uses according to the present invention can be used not just in the particular combination recited, but also in other combinations, without leaving the realm of the invention. For instance, the combination of a preferred feature with a particularly preferred feature or of a not further characterized feature with a particularly preferred feature, etc., is also implicitly comprehended even when this combination is not expressly mentioned.

Exemplary embodiments of the present invention, which do not limit the present invention, are described hereinbelow. More particularly, the present invention also comprehends those embodiments which result from the hereinbelow recited dependency references and hence combinations.

1. A polyurethane based on at least one polyisocyanate and at least one polyester polyol, wherein the polyester polyol is based on at least one polyhydric alcohol and a mixture of two or more dicarboxylic acids, wherein at least one of the two or more dicarboxylic acids is at least partly obtained from renewable raw materials.
2. The polyurethane according to embodiment 1 wherein the polyurethane comprises at least one chain extender.
3. The polyurethane according to embodiment 1 or 2 wherein the polyurethane is a thermoplastic polyurethane.
4. The polyurethane according to any of embodiments 1 to 3 wherein the at least one polyhydric alcohol is selected from the group consisting of aliphatic C2 to C6 diols.
5. The polyurethane according to any of embodiments 1 to 4 wherein the at least one polyhydric alcohol is selected from the group consisting of 1,3-propanediol and 1,4-butanediol.
6. The polyurethane according to any of embodiments 1 to 5 wherein the at least one polyhydric alcohol is a 1,3-propanediol at least partly obtained from renewable raw materials.
7. The polyurethane according to any of embodiments 1 to 6 wherein the mixture of two or more dicarboxylic acids comprises a sebacic acid at least partly obtained from renewable raw materials.
8. The polyurethane according to any of embodiments 1 to 7 wherein the mixture of two or more dicarboxylic acids comprises a sebacic acid at least partly obtained from renewable raw materials, and adipic acid.
9. The polyurethane according to any of embodiments 1 to 8 wherein the polyisocyanate is selected from the group consisting of 2,2'-, 2, 4'- and 4,4'-diphenylmethane diisocyanate (MDI), 2,4- and 2,6-tolylene diisocyanate (TDI), hexamethylene diisocyanate and 1-isocyanato-4-[(4-isocyanatocyclohexyl)methyl]cyclohexane (H12MDI).

10. The polyurethane according to any of embodiments 1 to 9 wherein the at least one chain extender is selected from the group consisting of C2 to C6 diols.
11. A process for producing a thermoplastic polyurethane, which process at least comprises the step of reacting at least one polyisocyanate and at least one polyester polyol, wherein the polyester polyol is based on at least one polyhydric alcohol and a mixture of two or more dicarboxylic acids, wherein at least one of the two or more dicarboxylic acids was at least partly obtained from renewable raw materials.
12. The method of using a polyurethane according to any of embodiments 1 to 10 or a polyurethane obtainable by a process according to embodiment 11 in the manufacture of moldings, hoses, self-supporting film/sheet, non-woven articles or fiber.
13. A molding, self-supporting film/sheet, hose, non-woven article or fiber comprising a polyurethane according to any of embodiments 1 to 10 or a polyurethane obtainable by a process according to embodiment 11.
14. A thermoplastic polyurethane based on at least one polyisocyanate and at least one polyester polyol, wherein the polyester polyol is based on at least one polyhydric alcohol and a mixture at least comprising sebacic acid and adipic acid, wherein the sebacic acid was at least partly obtained from renewable raw materials.
15. The polyurethane according to embodiment 14 wherein the polyurethane comprises at least one chain extender selected from the group consisting of 1,3-propanediol, 1,4-butanediol and 1,6-hexanediol.
16. The polyurethane according to embodiment 14 or 15 wherein sebacic acid and adipic acid are employed in a molar ratio of from 70:30 to 30:70.
17. The polyurethane according to any of embodiments 14 to 16 wherein the at least one polyhydric alcohol is selected from the group consisting of 1,3-propanediol and 1,4-butanediol.
18. The polyurethane according to any of embodiments 14 to 17 wherein the at least one polyhydric alcohol is a 1,3-propanediol at least partly obtained from renewable raw materials.
19. The polyurethane according to any of embodiments 14 to 18 wherein the polyisocyanate is selected from the group consisting of 2,2'-, 2, 4'- and 4,4'-diphenylmethane diisocyanate (MDI), 2,4- and 2,6-tolylene diisocyanate (TDI), hexamethylene diisocyanate and 1-isocyanato-4-[(4-isocyanatocyclohexyl)methyl]cyclohexane (H12MDI).
20. A process for producing a thermoplastic polyurethane, which process at least comprises the step of reacting at least one polyisocyanate and at least one polyester polyol, wherein the polyester polyol is based on at least one polyhydric alcohol and a mixture at least comprising sebacic acid and adipic acid, wherein the sebacic acid was at least partly obtained from renewable raw materials.
21. The method of using a polyurethane according to any of embodiments 14 to 19 or a polyurethane obtainable by a process according to embodiment 20 in the manufacture of moldings, hoses, self-supporting film/sheet, non-woven articles or fiber.
22. A molding, self-supporting film/sheet, hose, non-woven article or fiber comprising a polyurethane according to any of embodiments 14 to 19 or a polyurethane obtainable by a process according to embodiment 20.

The invention will now be more particularly elucidated by means of examples.

EXAMPLES

1. Materials Used

Polymer polyol 1 is a polyester diol constructed from sebacic acid (from renewable raw materials) and 1,3-propanediol (from renewable raw materials), molar mass 1440 g/mol, OH number=78

Polymer polyol 2 is a polyester diol constructed from azelaic acid (from renewable raw materials) and 1,3-propanediol (from renewable raw materials), molar mass 1400 g/mol, OH number=80

Polymer polyol 3 is a polyester diol constructed from sebacic acid (from renewable raw materials), adipic acid (1:1 mol % ratio between the two dicarboxylic acids) and 1,3-propanediol (from renewable raw materials), molar mass 1400 g/mol, OH number=80

Polymer polyol 4 is a polyester diol constructed from sebacic acid (from renewable raw materials), azelaic acid (from renewable raw materials) (1:1 mol % ratio between the two dicarboxylic acids) and 1,3-propanediol (from renewable raw materials), molar mass 1500 g/mol, OH number=74

Chain extender 1 (KV1) is 1,3-propanediol (from renewable raw materials), molar mass 76.09 g/mol Chain extender 2 (KV2) is 1,4-butanediol, molar mass 90.12 g/mol Isocyanate 1 is 4,4'-diphenylmethane diisocyanate (4,4'-MDI), molar mass 250.26 g/mol Hydrolysis control 1 is a carbodiimide-based hydrolysis control agent (Elastostab® H01)

2. Preparation Examples

2.1 General Processing Method 1

The particular polymer polyol is reacted with chain extender 1 and isocyanate 1. Hydrolysis control 1 is likewise added to the reaction mixture. The reaction mixture obtained is poured onto a heatable plate and fully reacted at 120° C. in the course of 10 minutes. The polymer plaque obtained is then conditioned at 80° C. for 24 hours. The polymer plaque is subsequently pelletized and the pellet material is injection molded into a test plaque.

2.2 Example 1 (Comparator)

Processing method 1 is used to react 56.95 wt % of polymer polyol 1, 7.96 wt % of chain extender 2, 34.63 wt % of isocyanate 1 and 0.46 wt % of hydrolysis control 1. The results are shown in table 1.

2.3 Example 2 (Comparator)

Processing method 1 is used to react 64.83 wt % of polymer polyol 2, 5.32 wt % of chain extender 1, 29.33 wt % of isocyanate 1 and 0.52 wt % of hydrolysis control 1. The results are shown in table 1.

2.4 Example 3 (Invention)

Processing method 1 is used to react 65.64 wt % of polymer polyol 4, 5.32 wt % of chain extender 1, 28.51 wt % of isocyanate 1 and 0.53 wt % of hydrolysis control 1. The results are shown in table 1.

2.5 Example 4 (Invention)

Processing method 1 is used to react 62.95 wt % of polymer polyol 3, 5.77 wt % of chain extender 1, 30.64 wt % of isocyanate 1 and 0.63 wt % of hydrolysis control 1. The results are shown in table 1.

TABLE 1

|  | Example 1 | Example 2 | Example 3 | Example 4 |
|---|---|---|---|---|
| hardness [Shore A] | 86 | 86 | 85 | 87 |
| tensile strength [MPa] | 38 | 29 | 39 | 41 |
| breaking extension [%] | 530 | 470 | 460 | 460 |
| breaking strength [N/mm] | 72 | 69 | 64 | 78 |
| abrasion loss [mm$^3$] | 26 | 63 | 33 | 24 |
| density [g/cm$^3$] | 1.168 | 1.166 | 1.155 | 1.191 |
| blooming | very severe | very severe | very slight | very slight |

3. Methods of Measurement

The individual parameters are determined by the following methods:
- hardness (Shore A): DIN 53505
- tensile strength: DIN 53504
- breaking extension: DIN 53504
- breaking strength: DIN ISO 34-1, B (b)
- abrasion loss: DIN ISO 4649
- density: DIN ISO 1183-1, A
- blooming: assessed visually for intensity following storage of test plaques for 4 weeks following their making at room temperature.

4. Result

As can be seen in the examples, the mechanical values are at a similar level for all the tests. However, the thermoplastic polyurethanes obtained according to the invention surprisingly have a distinctly reduced degree of blooming. The thermoplastic polyurethanes used as comparative examples have a clearly visible white, opaque bloom on the test plaques after 4 weeks of storage at room temperature. The thermoplastic polyurethanes obtained according to the invention, by contrast, only show very minimal, if any, signs of blooming after 4 weeks of storage at room temperature. This difference is clearly apparent to the naked eye.

We claim:

1. A thermoplastic polyurethane, comprising, in polymerized form:
   a polyisocyanate;
   an aliphatic polyester polyol, and
   at least one chain extender selected from the group consisting of 1,3-propanediol, 1,4-butanediol and 1,6-hexanediol,
   wherein the aliphatic polyester polyol comprises, in polymerized form, a polyhydric alcohol and a mixture of dicarboxylic acids, alcohols and carboxylic acids of the aliphatic polyester polyol being only aliphatic, wherein the mixture of dicarboxylic acids comprises a sebacic acid at least partly obtained from a renewable raw material, and a second dicarboxylic acid comprising adipic acid or azelaic acid,
   wherein the polyhydric alcohol is selected from the group consisting of 1,3-propanediol and 1,4-butanediol.

2. The polyurethane of claim 1, wherein the polyhydric alcohol is a 1,4-butanediol.

3. The polyurethane of claim 1, wherein the polyhydric alcohol is a 1,3-propanediol at least partly obtained from a renewable raw material.

4. The polyurethane of claim 1, wherein the second dicarboxylic acid comprises adipic acid.

5. The polyurethane of claim 4, wherein the sebacic acid and the adipic acid are used in a molar ratio of from 80:20 to 20:80.

6. The polyurethane of claim 1, wherein the polyisocyanate is selected from the group consisting of 2,2'-, 2,4'- and 4,4'-diphenylmethane diisocyanate (MDI), 2,4- and 2,6-tolylene diisocyanate (TDI), hexamethylene diisocyanate and 1-isocyanato-4-[(4-isocyanatocyclohexyl)methyl]cyclohexane (H12MDI).

7. A process for producing a thermoplastic polyurethane, the process comprising:
   reacting at least one polyisocyanate and at least one polyester polyol,
   wherein the polyester polyol comprises, in polymerized form, a polyhydric alcohol and a mixture of dicarboxylic acids,
   wherein the mixture of dicarboxylic acids comprises a sebacic acid at least partly obtained from a renewable raw material and a second dicarboxylic acid comprising adipic acid or azelaic acid.

8. A method for manufacturing a molding, hose, self-supporting film/sheet, non-woven article or fiber, the method comprising:
   employing the polyurethane of claim 1.

9. A molding, self-supporting film/sheet, hose, non-woven article or fiber, comprising the polyurethane of claim 1.

10. A method for manufacturing a molding, hose, self-supporting film/sheet, non-woven article or fiber, the method comprising:
    employing a thermoplastic polyurethane obtained by the process of claim 7.

11. A molding, self-supporting film/sheet, hose, non-woven article or fiber, comprising a thermoplastic polyurethane obtained by the process of claim 7.

12. The polyurethane of claim 1, having a tensile strength in a range of from 39 to 41 MPa.

13. The polyurethane of claim 1, having a density in a range of from 1.155 to 1.191 g/cm$^3$.

14. The polyurethane of claim 1, wherein the polyhydric alcohol is a 1,3-propanediol at least partly obtained from a renewable raw material, and
    wherein the second dicarboxylic acid comprises azelaic acid.

15. The polyurethane of claim 1, wherein the polyhydric alcohol is a 1,3-propanediol at least partly obtained from a renewable raw material, and
    wherein the second dicarboxylic acid comprises adipic acid.

16. The polyurethane of claim 1, wherein the polyhydric alcohol comprises a 1,3-propanediol at least partly obtained from a renewable raw material.

17. The polyurethane of claim 1, having a reduced tendency to bloom relative to a thermoplastic polyurethane that is the same other than comprising, instead of the mixture, the sebacic acid only.

18. A thermoplastic polyurethane, comprising, in polymerized form:
- a polyisocyanate;
- an aliphatic polyester polyol, and
- at least one chain extender selected from the group consisting of 1,3-propanediol, 1,4-butanediol and 1,6-hexanediol,
- wherein the aliphatic polyester polyol comprises, in polymerized form, a polyhydric alcohol and a mixture of dicarboxylic acids, alcohols and carboxylic acids of the aliphatic polyester polyol being only aliphatic,
- wherein the mixture of dicarboxylic acids comprises a sebacic acid at least partly obtained from a renewable raw material, and a second dicarboxylic acid,
- wherein the polyhydric alcohol is selected from the group consisting of 1,3-propanediol and 1,4-butanediol; and
- wherein an organophosphorus compound of trivalent phosphorus is excluded.

* * * * *